United States Patent

Rodgers

[11] Patent Number: 6,016,596
[45] Date of Patent: Jan. 25, 2000

[54] MOUNTING APPARATUS AND METHOD OF USE

[76] Inventor: John Rodgers, 3808 Morningside Dr., N. Ellenton, Fla. 34222

[21] Appl. No.: 08/861,128

[22] Filed: May 21, 1997

[51] Int. Cl.[7] .................................................. B23P 19/00
[52] U.S. Cl. ........................ 29/426.6; 29/450; 248/27.3; 362/365
[58] Field of Search .................................. 29/450, 426.6, 29/451; 248/27.1, 27.3; 362/382, 390, 404, 365, 366

[56] References Cited

U.S. PATENT DOCUMENTS

| | | |
|---|---|---|
| 1,483,218 | 2/1924 | Fahnestock . |
| 2,353,795 | 7/1944 | Tinnerman . |
| 3,438,603 | 4/1969 | Bennekom . |
| 3,620,401 | 11/1971 | Lund . |
| 3,697,025 | 10/1972 | Edwards . |
| 3,728,144 | 4/1973 | Dixson et al. . |
| 4,693,438 | 9/1987 | Angell ...................................... 248/27.3 |
| 4,760,510 | 7/1988 | Lahti ........................................ 362/365 |
| 5,044,985 | 9/1991 | Sheen ................................. 248/24.3 X |
| 5,068,772 | 11/1991 | Shapiro et al. ......................... 362/365 |
| 5,314,148 | 5/1994 | Jones ...................................... 248/27.3 |
| 5,725,302 | 3/1998 | Sirkin ................................. 248/27.3 X |
| 5,941,625 | 8/1999 | Morand .................................. 362/365 |
| 5,944,412 | 8/1999 | Janos et al. ............................. 362/365 |

FOREIGN PATENT DOCUMENTS

| 2903176 | 7/1980 | Germany .............................. 248/27.3 |
|---|---|---|

Primary Examiner—David P. Bryant
Attorney, Agent, or Firm—Dorthy S. Morse

[57] ABSTRACT

An apparatus for mounting objects within a panel hole, and method of use, the apparatus comprising a housing having a flanged opening in one end and a plurality of flat coil springs each having a free inner end and an outside edge attached to the housing adjacent to the flange so that upon installation of the housing into the panel hole, the flange engages the exposed surface of the panel and the springs become biased against the hidden panel surface for secure vibration-resistant mounting of the housing within the hole, as well as rapid releasable installation and removal of the housing from panels of any thickness dimension. The apparatus can be made theft-resistant through placement of apertures in the flange, use of an installation and removal tool for unrolling the springs so that they are stretched to rapidly pass through the flange apertures, and creation of slight inward folds in the free inner ends of each coil spring for engaging the tool, or for engaging the panel if removal of the housing is attempted without the tool. The present invention can be used with panels of any thickness, when installed it is vibration-resistant, and it can be securely positioned within inaccurately cut panel holes. Easily detachable springs are also contemplated in the theft-resistant embodiment. Applications may include, but are not limited to, use in the rapid releasable mounting of lighting fixtures within ceiling panels, as well as the vibration-resistant mounting of industrial and motor vehicle gauges.

21 Claims, 4 Drawing Sheets

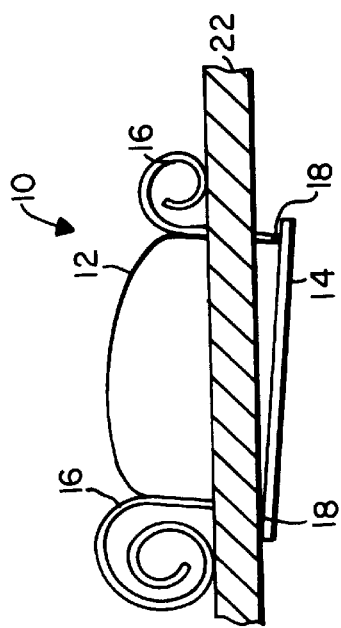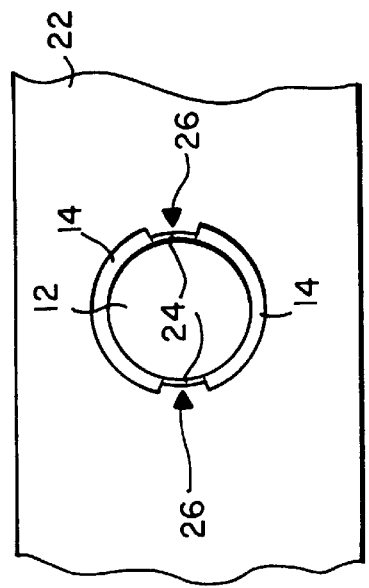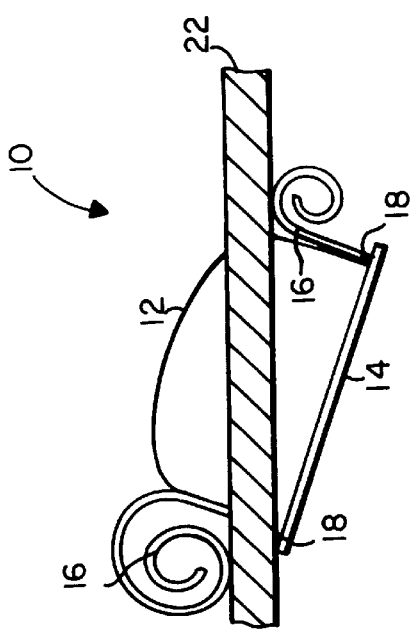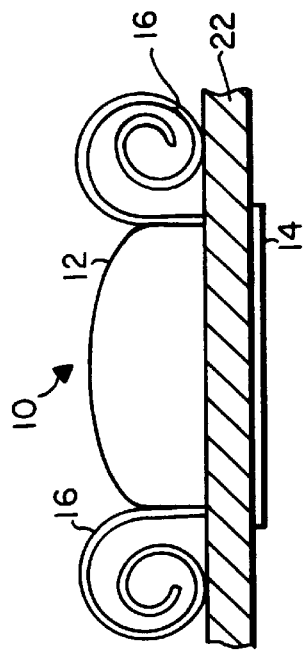

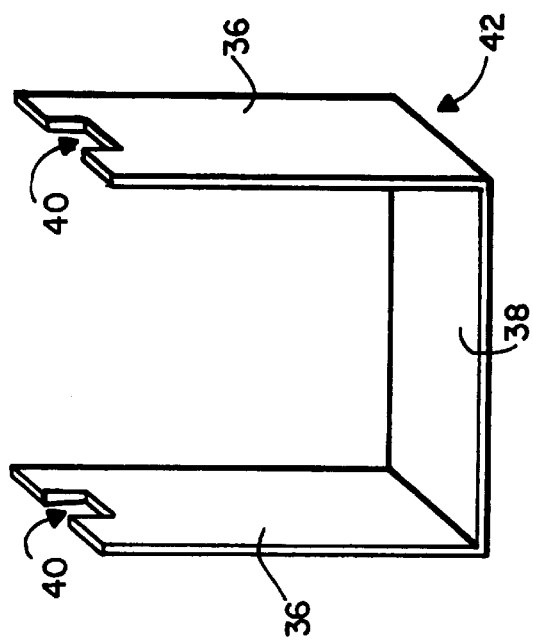
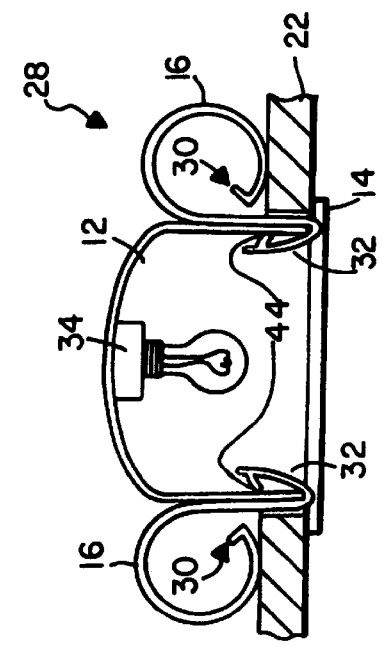
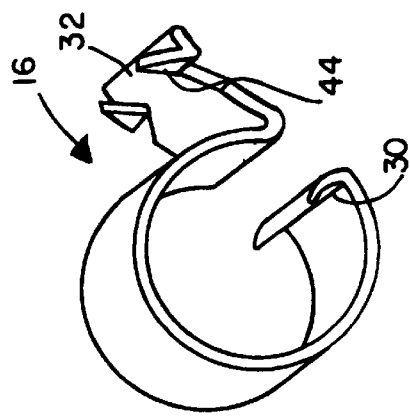
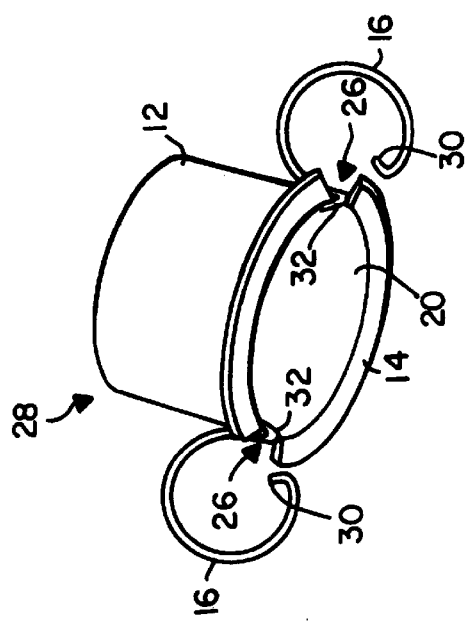
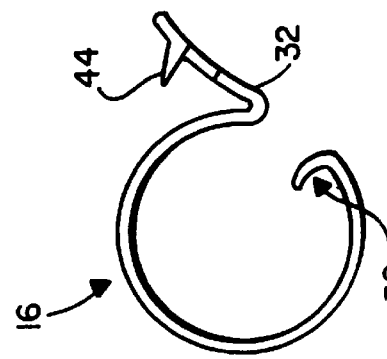

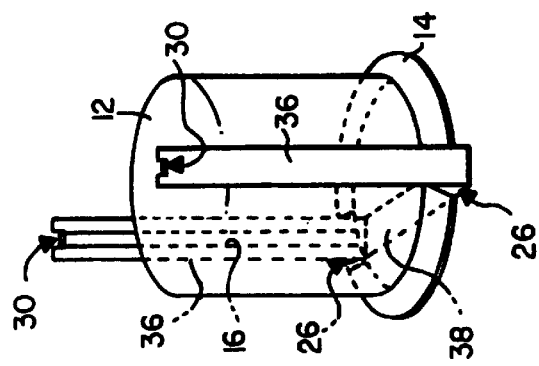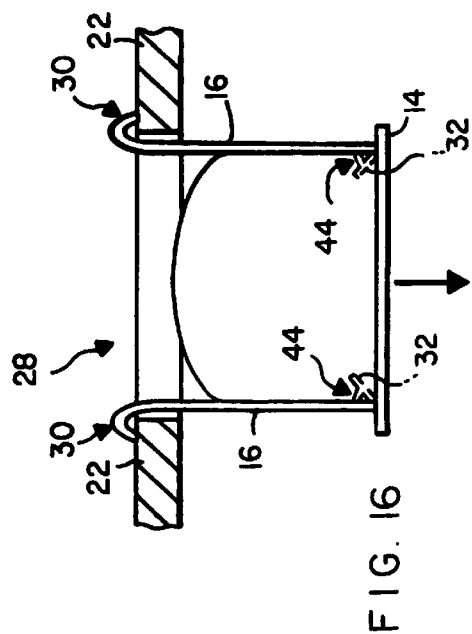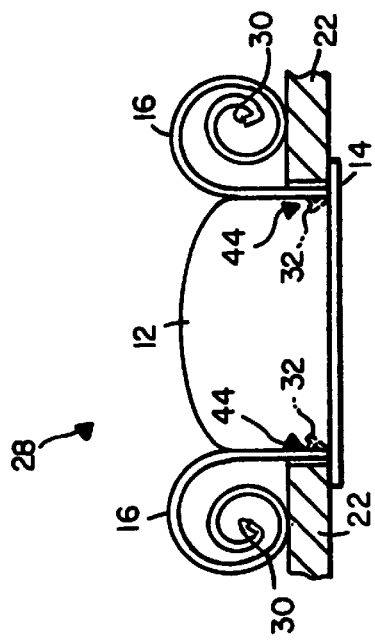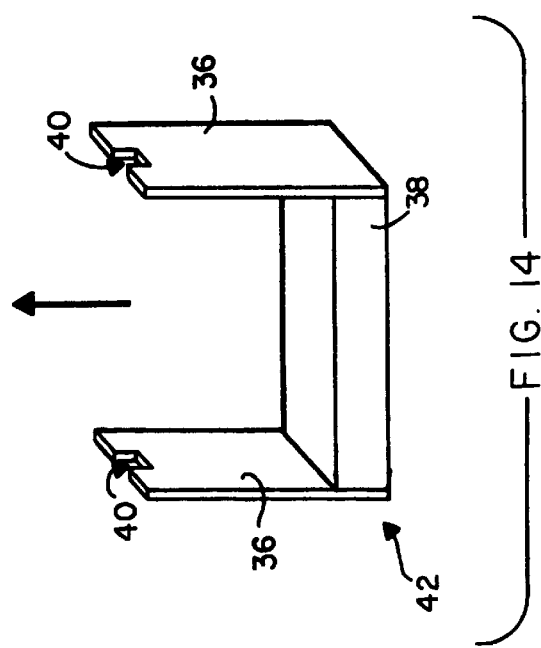

MOUNTING APPARATUS AND METHOD OF USE

BACKGROUND—FIELD OF INVENTION

This invention relates to devices for mounting at least one object within a hole in a panel. such as devices used for mounting a recessed lighting fixture within a ceiling panel having an exposed surface and an opposed hidden surface, specifically to an apparatus comprising a housing having an opening in one end; a flange attached to the housing around its opening for engaging the exposed surface of the panel around the hole; and a plurality of self-recoiling flat springs each having an infinite number of uncoiled extended states when subject to tensioning forces for engaging the hidden surface of the panel and biasing the flange against the exposed surface of the panel so that the flange and the self-recoiling flat springs in combination provide secure rapid vibration-resistant positioning of the housing within the panel hole. Removal of the housing from the panel is also rapid and simply requires the application of a tensioning force to the flange to pull it away from the exposed surface of the panel until the self-recoiling flat springs extend sufficiently to release the housing from the panel hole. A theft-resistant embodiment of the present invention comprises apertures in the flange and a removal and installation tool which when inserted through the apertures promptly unrolls the self-recoiling flat springs into their uncoiled extended state for easy movement thereof through a panel hole at the same time the housing is drawn away from the panel hole. During installation, when the flange of the theft-resistant embodiment becomes positioned against the exposed surface of the panel, the tool is withdrawn and the self-recoiling flat springs instantaneously recoil to engage the hidden surface of the panel and become biased against it to lock the housing securely in place within the panel hole. The tool may later be inserted through the apertures in the flange to unroll the self-recoiling flat springs into their uncoiled extended state and assist the rapid removal of the housing from the panel hole. The present invention is vibration-resistant when installed into a panel hole, can be used with panels of any thickness dimension, can be inserted into panel holes which are not accurately cut, and the theft-resistant embodiment comprises a slight inward fold on the unattached inwardly coiled end of each self-recoiling flat spring for slip-proof engagement with a rectangular cutout in the distal end of the insertion and removal tool as well as engagement with the hidden surface of the panel to prevent housing removal without the tool. Slip-proof engagement results from the self-recoiling flat springs being positioned so that they tend to re-roll away from the housing. This positioning also results in the folds being biased toward the arms of the tool when engaged thereby so the housing and tool together can be rapidly withdrawn from a panel hole. Applications of the present invention may include, but are not limited to, use in the rapid mounting of lighting fixtures into ceiling panels during construction and renovation work, the rapid mounting of industrial gauges, releasable vibration-resistant mounting of gauges in motorized racing and test vehicles, and the mounting of any other object into a panel for which rapid installation and removal would be beneficial for time-saving repositioning and reuse of the object in other locations.

BACKGROUND—DESCRIPTION OF PRIOR ART

Mounting a recessed lighting fixture within a ceiling panel hole with prior art devices requires several considerations. First, one must determine the thickness of the panel into which the mounting device for the lighting fixture will be placed. Then a mounting device having hardware dimensioned for secure mounting into a panel of the determined thickness must be selected. If the panel thickness is incorrectly measured, an alternate mounting device might be required since many prior art mounting devices will provide secure mounting only within a narrow range of panel thickness. Also, in large construction projects, where it is contemplated for many recessed lighting fixtures to be installed, ceiling panel thickness may not be uniform throughout the project and would then require that several different sizes of mounting devices be ordered and handled on the job site. The increased complexity of ordering several different sizes of any type of building material, possible inaccuracy in filling orders, and increased handling on a job site all contribute to a more labor intensive process and higher costs.

Another consideration in mounting a recessed lighting fixture with prior art devices is the preparation of the panel hole into which its mounting device will be positioned. Prior art mounting devices often require an accurately cut panel hole for secure and attractive mounting. Templates are many times provided for such a purpose. The cutting of accurate panel holes with a template is also a more labor intensive process, and would result in higher installation costs than if less accurately cut panel holes could be used.

A further consideration in mounting recessed lighting fixtures with prior art devices, particularly in earthquake prone areas, is the installation of mounting devices so that they are securely positioned and resistant to vibration. Often this requires the use of additional hardware, such as the addition of sheet metal screws to lock spring clips securely in place against fixture housings. This too requires additional labor and increased construction costs. The present invention eliminates the need to individually address each of these considerations by providing a mounting apparatus with a housing having a flange around an opening on one end that engages the exposed surface of a panel, in combination with at least two self-recoiling flat springs attached to the housing adjacent to the flange at evenly spaced apart distances from one another and which each engage the hidden surface of the panel after installation to securely hold the flange in place against the exposed surface of the panel and securely maintain the housing within the hole. An alternative embodiment of the present invention provides a mounting apparatus having a flange and at least two self-recoiling flat springs which can be made theft-resistant by placement of apertures through the flange and a slight inward fold on the free inner end of each self-recoiling flat spring for engagement with rectangular cutouts in the distal ends of the arms of an installation and removal tool which must then be employed to rapidly install and remove the mounting apparatus housing from the panel hole by unrolling the self-recoiling flat springs into their uncoiled extended state so that each is able to easily pass through the flange apertures, and after installation when the self-recoiling flat springs become re-rolled and are in biased contact with the hidden surface of a panel, the self-recoiling flat springs lock the housing securely into place within a panel hole to make the positioning of the housing within the panel vibration-resistant, adaptable to panels of any thickness dimension, adaptable to inaccurately cut panel holes, and theft-resistant since the slight inward fold on the unattached inwardly coiled end of each self-recoiling flat spring will engage and grip the hidden surface of the panel upon attempted removal of the housing from the panel hole unless the installation and removal tool or extreme force is used to engage the folds and cause them to release their grip on the panel.

SUMMARY OF INVENTION—OBJECTS AND ADVANTAGES

It is the primary object of this invention to provide a mounting device which can be rapidly inserted into and removed from a panel hole when convenient access to the panel is limited to one side of the panel. It is also an object of this invention to provide a mounting device which can be inserted securely into a panel of any thickness dimension greater than the minimum thickness required to support its weight and the weight of the objects mounted therein. A further object of this invention is to provide a mounting device which is securely positioned after installation so as to be vibration-resistant. It is also an object of this invention to provide a mounting device which can be made theft-resistant. A further object of this invention is to provide a mounting device which can be used with panel holes that have not been precisely cut. It is also an object of this invention to provide a mounting device which is simple in design and cost effective to use. A further object of this invention is to provide a mounting device which is cost effective to manufacture. It is also an object of this invention to provide a mounting device which can be partially dismantled for efficient packaging during transport and storage.

As described herein, properly manufactured and installed within a hole in a panel, the present invention would provide a means by which objects can be rapidly mounted within a panel and then almost instantaneously removed therefrom upon demand when the objects need to be relocated. While the examples given herein directly relate to the installation of recessed lighting fixtures in ceiling panels, other applications are also within the scope of the present invention. No labor would be required for the unfastening of screws, bolts, or nuts to remove the present invention, yet it would be securely positioned and vibration-resistant during use. The present invention uses at least two self-recoiling flat springs having an infinite number of uncoiled extended states when subject to tensioning forces for securing its housing within a panel hole, one end of each self-recoiling flat spring being attached to the housing with the self-recoiling flat springs being positioned at evenly spaced apart distances from one another, and which in their many uncoiled extended states can securely mount the housing within panels having any thickness dimension. The present invention also contemplates an embodiment having detachable self-recoiling flat springs that would allow the instantaneous substitution of larger or smaller self-recoiling flat springs for additional flexibility in the rapid installation of a uniform size of housing into panels widely ranging in thickness. Such flexibility would eliminate the need to special-order mounting devices of non-standard sizes, that often prove to be expensive, for non-standard applications. For example, when using the present invention, a single housing with its self-recoiling flat springs could be securely installed within a panel having a one-half inch thickness, and using the same self-recoiling flat springs the housing could just as securely be positioned within a two or three inch thick panel. Its vibration-resistant positioning within the panel hole would not be affected by placement into the thicker panel since the self-recoiling flat springs would remain biased against the hidden surface of the panel, even though a shorter amount of the self-recoiling flat spring length would remain in a coiled configuration. However, if detachable self-recoiling flat springs were used and the original self-recoiling flat springs were replaced with a second set of self-recoiling flat springs each having a stretched length three times longer than that of the original self-recoiling flat springs, the same housing could be promptly and easily installed into a seven, eight, or nine inch thick panel. In a similar manner, using the apparatus of the present invention, it is contemplated for any size panel to be accommodated, the only limiting factor being a minimum thickness of panel required to support the weight of the housing and the objects to be mounted therein. In the present invention it is also contemplated for the present invention to have detachable self-recoiling flat springs with barbs on the outside ends thereof. Such barbs would allow each self-recoiling flat spring to securely grip the interior of the housing wall during use, but at the same time allow rapid exchange of one self-recoiling flat spring for another, or separation of the self-recoiling flat springs from the housing for more compact invention transport and storage. A slight inward fold on the inner free end of each self-recoiling flat spring would allow it slip-free attachment to the distal end of an installation and removal tool, as well as to allow it to grip into the hidden surface of the panel during attempts to remove the housing attached thereto from a panel without use of the tool contemplated for such use.

Further, the housing of the present invention has an opening on one end which is surrounded by a flange. The flange and self-recoiling flat springs in combination permit the present invention to be securely installed into panel holes which are not accurately prepared. Neither the insertion of the housing, nor its vibration-resistant positioning within a panel, will be compromised by an inaccurately cut panel hole. The inaccuracy can even extend beyond any one portion of the flange width when it is contemplated for decorative trim to be positioned over the flange. Also, the flange of the theft-resistant embodiment has at least two opposed apertures of sufficient dimension to allow insertion therethrough of the arms of a tool which unrolls each of the self-recoiling flat springs used into an uncoiled extended state for virtually instantaneous passage of the housing through a panel hole. When a slight inward fold is placed in the inner free end of each self-recoiling flat spring, it secures the end of one of the arms of the tool against the self-recoiling flat spring for prompt installation and removal of the housing but the folds also will be forwardly biased to grip into the hidden surface of a panel hole to prevent removal of the housing without the tool. The slight inward fold in the inner free end of at least one self-recoiling flat spring thus makes the present invention theft-resistant. It is contemplated for the tool to have arms which are adjustable in length so that one tool can install and remove housings having different sizes of self-recoiling flat springs. It is also contemplated for the cross member of the tool to be adjustable in length for use with housings of differing diameters. In the preferred embodiment it is contemplated for the outside diameter of each self-recoiling flat spring to be approximately one-and-one-half times the difference between the outside diameter of the housing and the diameter of the panel hole in the panel into which it will be installed. Since the self-recoiling flat springs attached to each housing are coiled away from the housing, and barbs on the detachable self-recoiling flat springs hold the outside ends of each self-recoiling flat spring securely against the inside walls of each housing, the installed housings are vibration-resistant and suitable for use in earthquake prone areas where threaded, and other, means of attachment could loosen over time.

The description herein provides preferred embodiments of the present invention but should not be construed as limiting the scope of the mounting apparatus invention. For example, variations in the diameter of the housing, the width of the flange, the number of apertures in the flange, the depth of the housing cavity, the uncoiled extended length of the self-recoiling flat springs, the width of the self-recoiling flat spring material, the materials from which the housing, the self-recoiling flat springs, and the flange are all made, the configuration and dimension of the handle portion of the installation and removal tool, and the materials from which the tool is made, other than those shown and described herein, may be incorporated into the present invention. Thus the scope of the present invention should be determined by the appended claims and their legal equivalents, rather than the examples given.

BRIEF DESCRIPTION OF THE DRAWINGS

FIG. 5 shows a side view of the first preferred embodiment of the invention housing being installed within a panel hole with one self-recoiling flat spring engaging the hidden panel surface and the other self-recoiling flat spring being partially unrolled into the stretched configuration required for insertion through the panel hole.

FIG. 6 shows a side view of the first preferred embodiment of the invention housing being installed within a panel hole with one self-recoiling flat spring engaging the hidden panel surface and the other self-recoiling flat spring as it starts to automatically recoil after being inserted through the panel hole.

FIG. 7 shows a side view of the first preferred embodiment of the invention housing after being installed within a panel hole with both self-recoiling flat springs securely engaging the hidden panel surface.

FIG. 8 is a bottom view of the exposed surface of a panel with the flange of a second embodiment of the invention having apertures therethrough and engaging the exposed panel surface to help secure the invention housing in place within the panel hole.

FIG. 9 is a perspective view of a second embodiment of the invention having a housing, a flange with apertures therethrough, and detachable self-recoiling flat springs each with a slight inward fold in its inner free end.

FIG. 10 is a perspective view of one embodiment of the installation and removal tool of the invention.

FIG. 11 is a side view of one of the detachable self-recoiling flat springs of the second embodiment of the invention having a slight inward fold on its inner free end and a plurality of barbs on its outside end.

FIG. 12 is a perspective view of one of the detachable self-recoiling flat springs of the second embodiment of the invention having a slight inward fold on its inner free end and a plurality of barbs on its outside end.

FIG. 13 is a sectional side view of the housing of the second embodiment of the invention positioned within a panel hole and having a lighting fixture mounted therein.

FIG. 14 is an exploded side view of the housing of the second embodiment of the invention positioned within a panel hole and the tool of the invention positioned for insertion through flange apertures to engage the fold on the self-recoiling flat springs to force the self-recoiling flat springs to become extended and thereby allow easy passage of the housing through the panel hole, the tool being rotated slightly into a perspective view from its exact angle of insertion for clarity in the illustration of the rectangular cutouts in the distal ends of the tool.

FIG. 15 is a perspective view of both the housing and the tool of the second embodiment of the invention with the tool unrolling the self-recoiling flat springs into their uncoiled extended state required for the springs, tool, and housing to easily and rapidly pass through the flange apertures during both installation and removal of the housing from a panel hole.

FIG. 16 is a sectional side view of the housing of the second embodiment of the invention during attempted removal of the housing from a panel without use of the invention installation and removal tool with the slight inward folds on the inner ends of each self-recoiling flat spring gripping into the hidden surface of the panel to prevent easy removal of the housing.

DETAILED DESCRIPTION OF PREFERRED EMBODIMENTS

Figure 1:
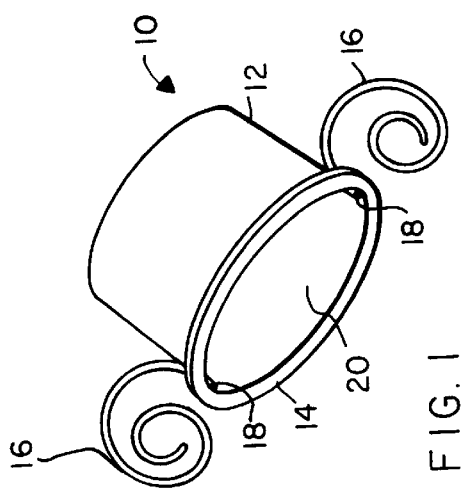
FIG. 1 is a perspective view of the first preferred embodiment of the invention having a housing, a flange without apertures, and two self-recoiling flat springs each with one of its ends attached to the housing.

FIG. 1 shows a first preferred embodiment of mounting device 10 having a cylindrical housing 12 with an opening 20 through one of its ends. The cylindrical configuration of housing 12 is not critical to mounting device 10. FIG. 1 also shows mounting device 10 having two self-recoiling flat springs 16 attached to the side walls of housing 12 in opposed positions. A fastener 18 attaches the outside end of each self-recoiling flat spring 16 to housing 12 adjacent to opening 20 so that each self-recoiling flat spring 16 remains positioned adjacent to the outside surface of housing 12 during use and coiling away from the outside surface of housing 12. The type of fastener 18 used is not critical to mounting device 10 as long as fastener 18 securely holds self-recoiling flat springs 16 against housing 12 during use. In the first preferred embodiment of the present invention it is contemplated for fastener 18 to be a rivet. Although FIG. 1 shows mounting device 10 having two self-recoiling flat springs 16, the number of self-recoiling flat springs 16 used is not critical to mounting device 10. Three, four, or more self-recoiling flat springs 16 are also contemplated by the present invention. The materials from which housing 12 is made are also not critical to the present invention, nor are its length and diameter dimensions. However, for most applications, in the preferred embodiment it is contemplated for housing 12 to be made from a lightweight metal or plastic material for ease in handling. The materials from which self-recoiling flat springs 16 are made also is not critical to the present invention, as long as the material is flexible and will not fatigue upon repeated extension and recoiling. However, in the preferred embodiments it is contemplated for self-recoiling flat springs 16 to be made from flattened spring-steel for some applications and 16-gauge and 18-gauge piano wire for other applications. FIG. 1 further shows a flange 14 positioned around opening 20 in housing 12. The outside diameter of flange 14 is not critical to the present invention, but in the preferred embodiment flange 14 is contemplated to have a minimum width of approximately one-half inch. The thickness of flange 14 is not critical to the present invention, however, in the preferred embodiment it is contemplated for flange 14 to be sufficiently thin to allow the attachment of decorative trim (not shown) thereover.

Figure 2:
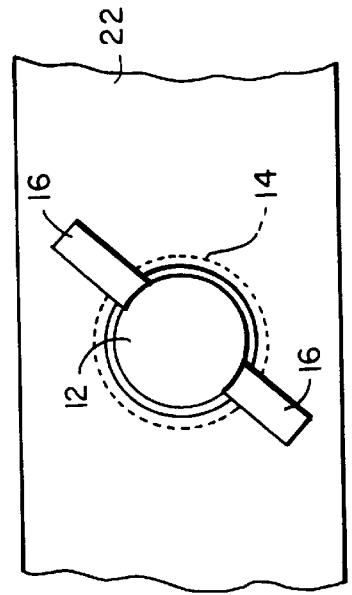
FIG. 2 is a top view of the hidden surface of a panel and the self-recoiling flat springs of the first preferred embodiment of the invention engaging the hidden surface to bias a housing attached to the self-recoiling flat springs and positioned between them securely into place within a panel hole.
Figure 3:
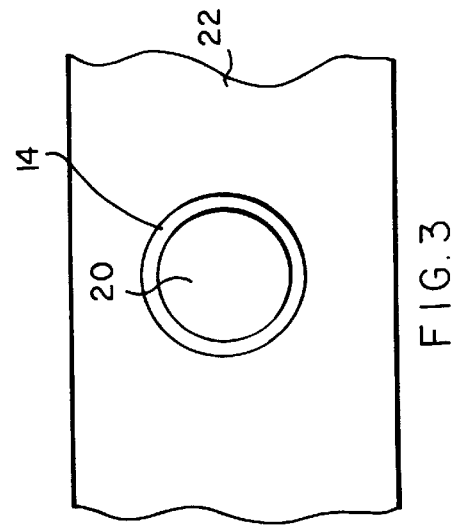
FIG. 3 is a bottom view of the exposed surface of a panel with the flange of the first preferred embodiment of the invention engaging the exposed surface to help secure the nvention housing in place within the panel in a vibration-resistant manner.

FIG. 2 shows housing 12 of the first preferred embodiment of mounting device 10 having two self-recoiling flat springs 16 and being positioned within a panel 22. Self-recoiling flat springs 16 are shown biasing housing 12 against the hidden surface of panel 22. The hidden surface of flange 14 is shown through the opening in panel 22, shown in FIG. 8 as number 24, through which housing 12 is inserted. In contrast, FIG. 3 shows the exposed surface of flange 14 of the first preferred embodiment of the present invention engaging the exposed surface of panel 22 to securely position housing 12 within panel 22. FIG. 3 shows opening 20 in housing 12 encircled by flange 14. Although not shown, it is contemplated for exposed surface of flange 14 to have a small thickness dimension so that decorative trim can be placed over flange 14 during use. In the preferred embodiment it is also contemplated for flange 14 to have sufficient width for placement over panel holes 24 which have not been accurately cut. The combination of the biasing action of self-recoiling flat springs 16 with the engagement of flange 14 against the exposed surface of panel 22 secures housing 12 to panel 22 in a vibration-resistant manner since there are no threaded fasteners, or other such devices, to work loose over time. Self-recoiling flat springs 16 also permit repeated, rapid, and releasable installation of housing 12 into panels 22 of any thickness dimension.

Figure 4:
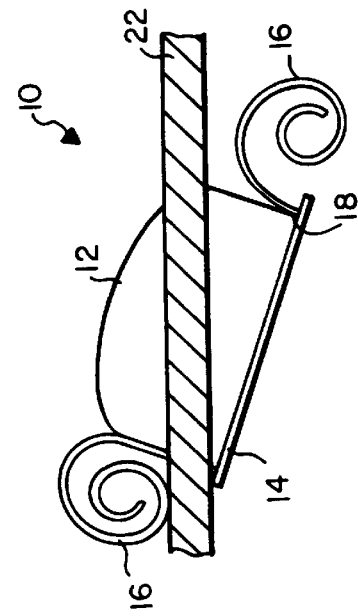
FIG. 4 shows a side view of the first preferred embodiment of the invention housing being installed within a panel hole with one self-recoiling flat spring engaging the hidden panel surface and the housing positioned at an oblique angle relative to the panel.

FIGS. 4–7 show a preferred sequence of steps for installing the first preferred embodiment of mounting device 10 within panel 22. FIG. 4 shows the positioning of housing 12 and flange 14 at an oblique angle relative to panel 22 with one self-recoiling flat spring 16 inserted through panel hole 24 (not shown in FIG. 4) to engage the hidden surface of panel 22. FIG. 4 also shows fasteners 18 holding self-recoiling flat springs 16 to the side walls of housing 12 near to flange 14.

FIGS. 5 and 6 also show the positioning of housing 12 and flange 14 at an oblique angle relative to panel 22 with one self-recoiling flat spring 16 inserted through panel hole 24 (not shown in FIGS. 5 or 6) to engage the hidden surface of panel 22. FIG. 5 shows the second self-recoiling flat spring 16 being partially unrolled into the stretched configuration required for insertion through panel hole 24, while FIG. 6 shows the second self-recoiling flat spring 16 as it starts to recoil immediately after insertion through panel hole 24. FIGS. 5 and 6 also show fasteners 18 holding one end of self-recoiling flat springs 16 to the side walls of housing 12 near to flange 14. FIG. 7 shows the first preferred embodiment of mounting device 10 positioned within panel 22 after installation, with flange 14 engaging the exposed surface of panel 22 and self-recoiling flat springs 16 each biased against the hidden surface of panel 22 to securely hold housing 12 within panel 22 in a vibration-resistant manner.

FIG. 8 shows a second preferred embodiment of the present invention, shown in FIG. 9 as number 28. FIG. 8 shows housing 12 is installed within panel 22 with flange 14 engaging the exposed surface of panel 22. FIG. 8 also shows two opposed apertures 26 in flange 14 through which a portion of panel hole 24 is visible. Apertures 26 allow insertion therethrough of a tool, shown in FIG. 10 as number 42, which can be used for rapid installation of housing 12 into, and rapid removal of housing 12 from, panel hole 24. Although FIG. 8 shows apertures 26 extending into the outside perimeter of flange 14, it is also contemplated for apertures 26 to be in the form of elongated slots (not shown) in flange 14 and having sufficient dimension for insertion therethrough of the arms of tool 42. The number of apertures 26 used in flange 14 would correspond to the maximum number of self-recoiling flat springs 16 contemplated for use in securing housing 12 within panel 22 to satisfy application requirements.

FIG. 9 shows second preferred embodiment 28 with flange 14 attached to housing 12 and two opposed apertures 26 positioned through flange 14 adjacent to opening 20. FIG. 9 also shows one self-recoiling flat spring 16 attached to housing 12 through each aperture 26 in a position so that it coils away from housing 12. Although the number of self-recoiling flat springs 16 used in the present invention is not critical, a minimum of two self-recoiling flat springs 16 is required to secure housing 12 in place against panel 22. However, it is required to have one aperture 26 in flange 14 for each contemplated self-recoiling flat spring 16, even if during actual installation of housing 12 within panel 22 a self-recoiling flat spring 16 is not placed in each aperture 26. Although in the second preferred embodiment it is contemplated to have self-recoiling flat springs 16 which are either permanently attached to housing 12, such as with fasteners 18, or removably connected to housing 12, in FIG. 9 self-recoiling flat springs 16 are shown to be detachable. FIG. 9 shows each spring 16 having an outside edge 32 and an inner free edge with a slight inward fold 30 therein.

FIG. 10 shows a first preferred embodiment of a tool 42 contemplated for installation and removal of second embodiment 28 from panel 22. FIG. 10 shows tool 42 having two arms 36 each connected at one of its ends to opposite ends of a cross-member 38 which can be used as a handle to manipulate tool 42. The number of arms 36 is not critical and would correspond to the maximum number of self-recoiling flat springs 16 contemplated for attachment to housing 12 and not the number of apertures in flange 14. For example, although flange 14 might have six apertures 26, if only four detachable self-recoiling flat springs 16 were attached to housing 12, tool 42 would only be required to have four arms 36, instead of six arms 36. The configuration of cross-member 38 is not critical to the present invention and although not limited to the following examples, it is possible for cross-member 38 to have a flat configuration, a rectangular configuration, or a cylindrical configuration, and it is also contemplated for cross-member 38 to be adjustable in length so as to adapt for use with housings 12 having different diameters. It is contemplated for arms 36 to have a flat configuration for easy movement through apertures 26 in flange 14 and to be flexible so as to be slightly biased toward one another to securely engage self-recoiling flat springs 16 which coil away from the outside surface of housing 12. The length of cross-member 38 would also be dimensioned, or adjusted, so that biased arms 36 would require slight separation upon entry into apertures 26, and so that upon insertion and removal of housing 12 from panel 22, adjacent arms 36 and self-recoiling flat springs 16 would positively engage one another for slip-free connection and faster movement of housing 12 through apertures 26. Such engagement is shown in FIG. 15 and it is contemplated for housing 12, tool 42, and stretched self-recoiling flat springs 16 to be inserted and removed through apertures 26 simultaneously as a single unit. Also, the minimum length of arms 36 would be that required to completely unroll self-recoiling flat springs 16 into a sufficiently stretched configuration for easy movement of housing 12, tool 42, and self-recoiling flat springs 16 through apertures 26. Rectangular cutouts 40 centrally positioned in the distal end of each arm 36 are dimensioned for slip-free insertion therein of the slight inward fold 30 of one self-recoiling flat spring 16. Since the width of self-recoiling flat springs 16 is not critical, and it is equally contemplated for self-recoiling flat springs 16 to be made from flat-rolled spring steel as it is self-recoiling flat springs 16 to be made from round 18-gauge or 16-gauge piano wire, the width of rectangular cutouts 40 would vary in different embodiments of tool 42 to complement the corresponding self-recoiling flat springs 16 made from different materials so as to retain the slight inward fold 30 on each self-recoiling flat spring 16 in a slip-free position during installation and removal of housing 12 from panel 22 to allow the attached self-recoiling flat spring 16 to easily pass through aperture 26.

FIGS. 11 and 12 show a preferred embodiment of detachable self-recoiling flat spring 16 having an non-coiled end extension 32 and having a pointed end remote from non-coiled end extension 32, and each self-recoiling flat spring 16 also having an inner free end having a slight inward fold 30 therein. The pointed ends of barbs 44 securely engage the inside wall of housing 12 when self-recoiling flat spring 16 is placed in its usable position and tension is placed on self-recoiling flat spring 16 as it engages panel 22 or tool 42, yet barbs 44 also allow detachable self-recoiling flat springs 16 to be easily releasable from housing 12 upon demand. Very little force is required to lift up on outside edge 32 to interrupt the attachment between barbs 44 and the inside wall of housing 12. Slight inward fold 30 also permits secure engagement of each self-recoiling flat spring 16 with rectangular cutouts 40 in tool 42 to maintain self-recoiling flat springs 16 in their uncoiled extended state during insertion and removal of housing 12, tool 42, and self-recoiling flat springs 16 as a unit through panel 22. Further, slight inward folds 30 grip into the hidden surface of panel 22 should removal of second embodiment 28 be attempted without tool 42, which makes second embodiment 28 resistant to theft.

FIG. 13 shows panel 22 contemplated as a ceiling panel and second embodiment 28 installed therein, and with housing 12 positioned so that the hidden surface of flange 14 engages the exposed surface of panel 22. FIG. 13 also shows a lighting fixture 34 mounted within housing 12 and two self-recoiling flat springs 16 attached to housing 12 so that the slight inward fold 30 on each self-recoiling flat spring 16 remains outside of housing 12 while non-coiled end extension 32 is positioned adjacent to the inside surface of housing 12 near to flange 14. Barbs 44 on non-coiled end extension 32 are in contact with the inside surface of housing 12. The major portion of each self-recoiling flat spring 16 is positioned outside housing 12 so as to engage the hidden surface of panel 22. Each self-recoiling flat spring 16 can be easily detached from housing 12 by lifting barbs 44 outward and away from the inside surface of housing 12 upon demand. It is not contemplated for the present invention to be limited to the mounting of lighting fixtures 34 and it is equally contemplated for housing 12 to be used to mount vibration-resistant gauges (not shown) and other objects within panel 22. Flange 14 is shown to have a small thickness dimension for easy placement of decorative trim (not shown) thereover.

FIG. 14 shows second embodiment 28 installed within panel 22 with housing 12 positioned within panel 22 so that the rear portion of flange 14 engages the exposed surface of panel 22. FIG. 14 also shows tool 42 having two arms 36, cross member 38 between arms 36 for use as a handle, and rectangular cutouts 40 in the distal ends of each arm 36. Tool 42 is rotated somewhat from its optimal insertion orientation to better illustrate rectilinear cuts 40 and tool 42 is shown positioned below flange 14 poised for insertion of arms 36 through apertures 26 in flange 14 and opening 24 in panel 22 (apertures 26 and opening 24 are not shown in FIG. 14). Once initially inserted, as the remainder of arms 36 move through apertures, rectangular cutouts 40 on each arm 36 engage with slight inward fold 30 on one self-recoiling flat spring 16 to cause extension of self-recoiling flat springs 16. When self-recoiling flat springs 16 are sufficiently extended so that they can easily pass through apertures 26, a withdrawing force applied to flange 14, or cross member 38, will cause housing 12, tool 42, and self-recoiling flat springs 16 to be removed from panel 22 simultaneously as a unit. FIG. 14 also shows self-recoiling flat springs 16 having non-coiled end extensions 32 positioned adjacent to the inside surface of housing 12 with barbs 44 in removable contact with housing 12 wherein self-recoiling flat springs 16 may be easily detachable from housing 12 between uses by applying a lifting force to each outside edge 32 to disengage barbs 44 from the inside surface of housing 12.

FIG. 15 shows second preferred embodiment 28 with the arms 36 of tool 42 engaging and stretching opposed self-recoiling flat springs 16 on either side of housing 12. Each slight inward fold 30 on the different self-recoiling flat springs 16 are positioned within rectangular cutout 40 of separate arms 36 for engagement of self-recoiling flat springs 16 and keeping self-recoiling flat springs 16 laterally stable in their extended configurations so they don't become separated from arms 36 during installation or removal of housing 12 from panel 22. Cross-member 38 of tool 42 is positioned across the exposed surface of flange 14 with the proximal end of each arm 36 positioned adjacent to one aperture 26. The extended configuration of self-recoiling flat springs 16, shown in FIG. 15, is necessary during both installation and removal of housing 12 from panel 22, otherwise slight inward folds 30 would grip into panel 22 and resist removal of housing 12, as shown in FIG. 16.

FIG. 16 shows second preferred embodiment 28 with housing 12 positioned within panel 22. FIG. 16 also shows flange 14 being pulled away from the exposed surface of panel 22 so that self-recoiling flat springs 16 are unrolled and placed in an extended configuration with the non-coiled end extension 32 of each self-recoiling flat spring 16 positioned adjacent to the inside surface of housing 12, barbs 44 in contact with housing 12, and slight inward folds 30 gripping the hidden surface of panel 22. When removal of housing 12 is attempted without tool 42 to engage slight inward folds 30 and bias them toward housing 12, slight inward folds 30 will grip into the hidden surface of panel 22 and prevent complete removal of housing 12 unless excessive force is applied to flange 14. Thus, slight inward folds 30 cause second embodiment 28 to be theft-resistant.

Both the first preferred embodiment of mounting device 10 and second preferred embodiment 28 are used to mount other objects, such as lighting fixture 34, into holes 24 cut into panels 22. The first preferred embodiment is used without tool 42 and one self-recoiling flat spring 16 at a time is passed through hole 24. The first self-recoiling flat spring 16 is easily inserted through hole 24. Housing 12 is then obliquely angled relative to panel 22 and the second self-recoiling flat spring 16 is manually unrolled beyond the end of housing 12 and quickly pushed through hole 24 before self-recoiling flat spring 16 has a chance to automatically recoil. Once positioned against the hidden surface of panel 22, both self-recoiling flat springs 16 become biased against the hidden surface of panel 22 to securely position housing 12 within hole 24. While self-recoiling flat springs 16 bias housing 12 against panel 22, flange 14 holds housing 12 within hole 24 by pressing against the exposed surface of panel 22. A person (not shown) attempting to remove the first preferred embodiment of mounting device 10 from panel 22, should try to position his or her fingers around flange 14 so that self-recoiling flat springs 16 do not snap against the fingers upon housing 12 removal. The person would then pull flange 14 away from panel 22 with sufficient force to cause self-recoiling flat springs 16 to sufficiently extend for rapid passage through hole 24 and release of housing 12 from panel 22. Upon removal, self-recoiling flat springs 16 would automatically recoil.

Use of theft-resistant second embodiment 28 requires tool 42. For insertion of housing 12 within hole 24 in panel 22, a person must slightly spread apart flexible arms 36, insert tool 42 through apertures 26 in flange 14, cause each rectangular cutout 40 to engage with a slight inward fold 30 in each self-recoiling flat spring 16, and extend each self-recoiling flat spring 16 attached to housing 12 into a sufficiently flat configuration to allow self-recoiling flat springs 16, tool 42, and housing 12 to simultaneously pass through hole 24 as a unit. Upon withdrawal of tool 42 from apertures 26, self-recoiling flat springs 16 will each automatically recoil and become biased against the hidden surface of panel 22 to securely position housing 12 within hole 24 in a vibration-resistant manner. To rapidly withdraw housing 12 from panel 22, a person would again slightly spread apart flexible arms 36, insert tool 42 through apertures 26 and hole 24 so that rectangular cutouts 40 in the distal ends of arms 36 engage slight inward folds 30 to unroll self-recoiling flat springs 16 into their uncoiled extended state. Arms 36 are biased slightly toward one another to remain closely positioned near to the outside wall of housing 12 so that housing 12, tool 42, and self-recoiling flat springs 16 can be rapidly removed as a unit from hole 24. Without tool 42, attempted removal of housing 12 from panel 22 would result in slight inward folds 30 gripping into the hidden surface of panel 22 to cause resistance against housing 12 removal. Although excessive force would release of second embodiment 28 from panel 22, the only means of easy rapid removal of housing 12 from panel 22 would be accomplished through the use of tool 42.

I claim:

1. An apparatus for rapid and removable vibration-resistant mounting of an object within a receiving hole in a panel having an exposed surface and a hidden surface where convenient access to the panel is limited to the exposed surface of the panel, said apparatus comprising:

a housing having a side wall, an end opening, an outside dimension slightly smaller than the diameter of the receiving hole into which insertion of said housing is intended, and a hollow interior of sufficient dimension and configuration for containing the object intended for mounting within the receiving hole;

a flange attached to said housing around said end opening, said flange having an outside dimension greater than the diameter of the receiving hole into which insertion of said housing is intended;

at least two self-recoiling flat springs, each of said self-recoiling flat springs having an infinite number of uncoiled extended states when subject to the application of tensioning forces, each of said self-recoiling flat springs having a fully extended length greater than the thickness of the panel into which insertion of said housing is intended, each of said self-recoiling flat springs having an unattached inwardly coiled end and an opposed outer end, each of said outer ends being securely fastened to said side wall of said housing near to said flange, said unattached inwardly coiled ends of said self-recoiling flat springs remaining outside of said housing and being biased to automatically recoil away from said housing after being placed into one of said uncoiled states, said self-recoiling flat springs also being attached to said housing in positions equally spaced apart from one another; and said apparatus further comprising fastening means configured for securely attaching said self-recoiling flat springs to said side walls during use so that when said self-recoiling flat springs are unrolled and inserted through said receiving hole in said panel and when said housing is also partially inserted into the same receiving hole, said self-recoiling flat springs automatically recoil and engage the hidden surface of the panel adjacent to the receiving hole to thereby cause said housing to be drawn through the receiving hole until said flange engages the exposed surface of the panel for rapid installation of said apparatus into the panel until such time as a tensioning force sufficient to unroll said self-recoiling flat springs is applied to said flange to cause removal of said housing from said panel.

2. The apparatus of claim 1 wherein said flange has a plurality of apertures therethrough and further comprising a removal and installation tool configured for use with said housing to unroll each of said self-recoiling flat springs attached to said housing simultaneously into an extended configuration for rapid movement of said housing, said tool, and said self-recoiling flat springs as a unit simultaneously through the receiving hole so that once said end opening of said housing is aligned with the exposed surface of the panel and said tool is withdrawn, said self-recoiling flat springs immediately re-roll to engage the hidden surface of the panel and lock said housing securely into place against the panel until said tool is again inserted through said apertures to unroll said self-recoiling flat springs and rapidly remove said housing and said self-recoiling flat springs from the panel, said tool also having at least one cross-member having opposite ends and a plurality of arms, each of said arms attached to one of said opposite ends, and wherein each of said self-recoiling flat springs has an inward fold on said unattached inwardly coiled end which grips onto the hidden surface of the panel when removal of said housing is attempted without use of said tool.

3. The apparatus of claim 2 wherein said fastening means comprises means which permit said self-recoiling flat springs to be easily detachable from said side wall between uses.

4. The apparatus of claim 3 wherein each of said self-recoiling flat springs has a non-coiled end extension with an exterior surface configured for positioning adjacent to said side wall of said housing during installation of said housing within a receiving hole, and wherein said fastening means comprises a plurality of barbs on said exterior surface for securely engaging said side wall of said housing during installation.

5. The apparatus of claim 2 wherein said fastening means comprises a plurality of rivets.

6. The apparatus of claim 1 wherein each of said self-recoiling flat springs has a diameter equivalent to one-and-one-half times the difference between the outside diameter of said housing and the diameter of the receiving hole in the panel into which installation of said housing is intended.

7. The apparatus of claim 1 wherein said fastening means comprises a plurality of rivets.

8. The apparatus of claim 1 wherein said flange has a small thickness dimension to allow placement thereover of decorative trim.

9. An apparatus for mounting and removal of objects from within a receiving hole in a panel having an exposed surface and a hidden surface where convenient access to the panel is limited to the exposed surface of the panel, said apparatus comprising:

a housing having a wall and an open end, an outside dimension slightly smaller than the diameter of the receiving hole into which insertion of said housing is intended, and a hollow interior of sufficient dimension for containing the objects intended for mounting within the receiving hole;

a flange attached to said housing around said open end, said flange having an outside dimension greater than the diameter of the receiving hole into which insertion of said housing is intended;

a plurality of apertures through said flange, said apertures being positioned adjacent to said housing wall and opposed from one another;

a plurality of self-recoiling flat springs each made of spring-steel and having an infinite number of uncoiled extended states when subject to the application of tensioning forces, each of said springs having an unattached inwardly coiled end and an exterior end, each of said exterior ends being attached to said wall adjacent to a different one of said apertures, each of said self-recoiling flat springs also having a fully extended length greater than the thickness of the panel into which insertion of said housing is intended, said unattached inwardly coiled ends of said self-recoiling flat springs remaining outside of said housing and being biased to automatically re-roll away from said housing after being placed into an extended configuration, said unattached inwardly coiled ends also each having a slight inward fold;

attachment means adapted for securely attaching said exterior ends to said wall; and a removal and installation tool for use with said housing wherein said tool can be inserted through said apertures in said flange to engage said inward folds and unroll said self-recoiling flat springs into a flattened and extended configuration for rapid installation of said housing within said hole in said panel so that once said open end of said housing is positioned flush with the exposed surface of the panel and said tool is withdrawn, said self-recoiling flat springs immediately re-roll to contact the hidden surface of the panel and lock said housing securely into place against the panel until said tool is again inserted through said apertures to unroll said self-recoiling flat springs and rapidly extract said housing from the panel.

10. The apparatus of claim 9 wherein said housing is cylindrical.

11. The apparatus of claim 9 wherein said attachment means comprises means which permit said self-recoiling flat springs to be easily detachable from said wall between uses.

12. The apparatus of claim 11 wherein each of said self-recoiling flat springs has a non-coiled end extension with an exterior surface configured for positioning adjacent to said wall of said housing during installation of said housing within said receiving hole, and wherein said attachments means comprises a plurality of barbs on said exterior surface for securely engaging said wall of said housing during the installation.

13. The apparatus of claim 9 wherein each of said self-recoiling flat springs has a diameter equivalent to one-and-one-half times the difference between the outside diameter of said housing and the diameter of the receiving hole in the panel into which installation of said housing is intended.

14. The apparatus of claim 9 wherein said fastening means comprises a plurality of rivets.

15. A method for rapid installation of a mounting device configured for securing objects within a hole in a panel having an exposed surface and a hidden surface and where convenient access to said panel is restricted to said exposed surface, and which provides for theft-resistant and vibration-resistant attachment of said mounting device to said panel yet allows said mounting device to be easily releasable from said panel for time-saving object replacement and relocation to another mounting site, said method comprising the steps of providing a housing having an opening in one end and a hollow interior of sufficient size for insertion therein of an object contemplated for installation within a panel, a flange, and a plurality of self-recoiling flat springs each having an infinite number of uncoiled extended states when subject to the application of tensioning forces and also having an inner end and an opposed outer end;

attaching said flange around said opening in said housing;

attaching said outer end of each of said self-recoiling flat springs to said housing adjacent to said opening so that said self-recoiling flat springs remain outside of said housing adjacent to the outside surface of said housing and biased to recoil away from said housing;

holding said flange to position said housing and said self-recoiling flat springs adjacent to the hole; and rapidly securing said housing within the hole through the steps of extending said self-recoiling flat springs into a stretched configuration; inserting said self-recoiling flat springs while extended through the hole; partially inserting said housing into the hole; and releasing said flange so that said self-recoiling flat springs automatically recoil to biasingly engage the hidden surface of the panel and thereby cause said flange to contact the exposed surface of the panel to securely position said housing within the hole in a vibration-resistant manner.

16. The method of claim 15 further comprising the steps of providing an installation tool with arms each having a distal end, a flange having apertures therethrough, and said self-recoiling flat springs each having an inner folded end; placing said distal ends of said tool through said apertures in said flange; pushing said distal ends against said self-recoiling flat springs to extend said self-recoiling flat springs into a stretched configuration and until said folded ends engage said distal ends; inserting said tool simultaneously with said housing and said self-recoiling flat springs into the hole in the panel; and withdrawing said tool from said apertures to allow said self-recoiling flat springs to recoil and automatically bias against the hidden surface of said panel.

17. The method of claim 16 further comprising the step of providing self-recoiling flat springs which are rapidly detachable from said housing.

18. The method of claim 17 further comprising the step of providing self-recoiling flat springs having barbs for secure attachment to said housing during use.

19. The method of claim 16 further comprising the step of rapidly removing said housing from the panel through the steps of inserting said tool into said apertures and through the panel hole until said distal ends of said tool engage said folded ends so as to extend each of said self-recoiling flat springs into a nearly flat configuration; pulling said housing, said tool, and said self-recoiling flat springs as a unit through the panel hole while said self-recoiling flat springs are in said nearly flat configuration until said housing is completely withdrawn from said panel hole; and withdrawing said tool from said apertures to allow said self-recoiling flat springs to again recoil.

20. The method of claim 15 wherein the step of providing a plurality of flat coil springs comprises the step of providing a plurality of self-recoiling flat springs wherein each of said self-recoiling flat springs has a diameter equivalent to one-and-one-half times the difference between the outside diameter of said housing and the diameter of the receiving hole in the panel into which installation of said housing is intended.

21. The method of claim 15 further comprising the step of rapidly removing said housing from the panel through the steps of pulling said flange away from the panel with a force that causes said self-recoiling flat springs to sufficiently stretch to move easily through the hole and further pulling said housing and said self-recoiling flat springs through the hole.

\* \* \* \* \*